J. Y. KING.
SHOCK ABSORBING SPRING.
APPLICATION FILED APR. 10, 1920.

1,393,140.

Patented Oct. 11, 1921.

Inventor
John Y. King
By W. N. Williamson
Atty.

UNITED STATES PATENT OFFICE.

JOHN Y. KING, OF LANSDOWNE, PENNSYLVANIA.

SHOCK-ABSORBING SPRING.

1,393,140. Specification of Letters Patent. Patented Oct. 11, 1921.

Application filed April 10, 1920. Serial No. 372,785.

*To all whom it may concern:*

Be it known that I, JOHN Y. KING, a citizen of the United States, residing at Lansdowne, in the county of Delaware and State of Pennsylvania, have invented new and useful Improvements in Shock-Absorbing Springs, of which the following is a specification.

My invention relates to a new and useful improvement in shock absorbing springs, and has for its object to so construct such a spring of the type known as the leaf spring as to absorb the shock incident to the rebound of the spring, thereby increasing the comfort of the vehicle to which the spring is applied, and at the same time prevent the breakage of such springs by said rebound.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawing forming a part of this application, in which:—

In carrying out my invention as here embodied, 1 represents a flat spring composed of a series of leaves each succeeding leaf longer than the other, the longest leaf terminating in the eye turned for the reception of the shackle bolt, and on the reverse side of the long leaf I place the shock absorbing leaf or leaves 3 it being understood that any number of these shock absorbing leaves may be utilized but for convenience in illustration I have shown only one such leaf secured to the spring by the usual clips 4.

Figure 1:
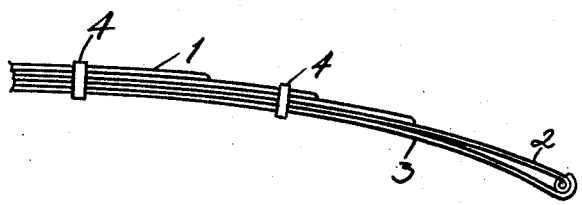
Figure 1, is an edge view of a spring made in accordance with my improvement.

In Fig. 1 I have shown the shock absorbing leaf as extending the entire length of the longest leaf of the spring but is spaced therefrom throughout a portion of its length and is attached to the outer end thereof by partially surounding the shackle bolt eye with the outer end of the shock absorbing leaf 3; or these ends may be attached together in any other suitable maner.

Figure 2:
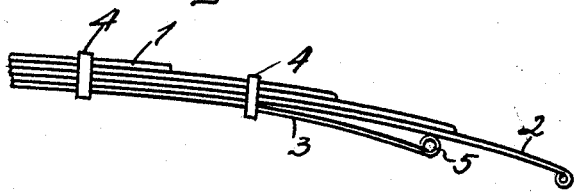
Fig. 2, is a similar view of a slight modification thereof.

Fig. 2, I have shown the shock absorbing leaf as having an enlargement 5 formed upon its end adapted to ride upon the reverse side of the long leaf of the spring and a portion of the shock absorbing spring in this case is also spaced from the main spring.

By constructing a spring in this manner the shock absorbing leaf or leaves will absorb the shock incident to the rebounding of the spring, thus giving a soft riding action to the vehicle and prevent the snapping or breaking of the spring when the rebound is abnormal.

My improvement may be readily embodied in a spring of any shape and will entirely overcome the disadvantages heretofore experienced in flat leaf springs and avoid the necessity of using independent shock absorbers as is now utilized.

Of course I do not wish to be limited to the exact details of construction as herein shown as these may be varied within the limits of the appended claims without departing from the spirit of my invention.

Having thus fully described my invention, what I claim as new and useful is:—

1. A semi-elliptic leaf spring comprising a plurality of leaves, the lowermost of said leaves spaced from the adjacent leaf a portion of its length, said leaf being provided with an integral enlargement bearing directly against said adjacent leaf.

2. A semi-elliptic leaf spring comprising a plurality of leaves, the lowermost of said leaves spaced from the adjacent leaf a portion of its length, said leaf being provided with an integral enlargement bearing directly against said adjacent leaf a short distance from said adjacent leaf.

3. A semi-elliptic leaf spring comprising a plurality of leaves and having an eye for attachment to a shackle bolt, the lowermost of said leaves spaced from the adjacent leaf a portion of its length, the outer end of said leaf partially encircling said eye and bearing directly against said eye.

4. A semi-elliptic leaf spring comprising a plurality of leaves, the leaf adjacent the lowermost one having an eye for attachment to a shackle bolt, the lowermost of said leaves spaced from said adjacent leaf a portion of its length, the outer end of said leaf bearing directly against a portion of said adjacent leaf and partially encircling said eye.

In testimony whereof, I have hereunto affixed my signature.

JOHN Y. KING.